(12) United States Patent
Patel

(10) Patent No.: US 11,777,527 B1
(45) Date of Patent: Oct. 3, 2023

(54) DYNAMIC PERMUTATION BASED CODING FOR GENERATING PERMUTED BITS AND PARITY EQUATIONS THEREOF

(71) Applicant: Mahesh Rameshbhai Patel, Houston, TX (US)

(72) Inventor: Mahesh Rameshbhai Patel, Houston, TX (US)

( * ) Notice: Subject to any disclaimer, the term of this patent is extended or adjusted under 35 U.S.C. 154(b) by 0 days.

(21) Appl. No.: 16/912,422

(22) Filed: Jun. 25, 2020

(51) Int. Cl.
  *H03M 13/00* (2006.01)
  *H03M 13/15* (2006.01)

(52) U.S. Cl.
  CPC ..... *H03M 13/1575* (2013.01); *H03M 13/615* (2013.01)

(58) Field of Classification Search
  None
  See application file for complete search history.

(56) References Cited

U.S. PATENT DOCUMENTS

| | | | | |
|---|---|---|---|---|
| 7,168,025 | B1* | 1/2007 | Berkovich | G06F 16/2255 |
| | | | | 714/759 |
| 8,175,190 | B2* | 5/2012 | Yonge, III | H04L 27/3411 |
| | | | | 370/208 |
| 8,660,013 | B2* | 2/2014 | Yonge, III | H04L 25/0236 |
| | | | | 370/241 |
| 2010/0162075 | A1* | 6/2010 | Brannstrom | H04L 1/06 |
| | | | | 714/752 |
| 2010/0268918 | A1* | 10/2010 | Priewasser | H03M 13/6513 |
| | | | | 712/208 |
| 2014/0053037 | A1* | 2/2014 | Wang | H03M 13/13 |
| | | | | 714/752 |
| 2014/0068117 | A1* | 3/2014 | Huebner | G06F 13/1673 |
| | | | | 710/52 |
| 2014/0101510 | A1* | 4/2014 | Wang | H03M 13/1117 |
| | | | | 714/758 |
| 2015/0295593 | A1* | 10/2015 | Trifonov | H03M 13/3746 |
| | | | | 714/776 |
| 2017/0187491 | A1* | 6/2017 | Jang | H04L 1/0045 |
| 2017/0264316 | A1* | 9/2017 | Lee | H03M 13/1128 |
| 2018/0183465 | A1* | 6/2018 | Vivier | H03M 13/6522 |
| 2020/0099394 | A1* | 3/2020 | Chang | H03M 13/1137 |
| 2020/0145092 | A1* | 5/2020 | Jung | H04B 7/0413 |
| 2020/0252080 | A1* | 8/2020 | Lam | H03M 13/112 |

\* cited by examiner

*Primary Examiner* — Mujtaba M Chaudry
(74) *Attorney, Agent, or Firm* — Leavitt Eldredge Law Firm

(57) ABSTRACT

With rapid increase in wired/wireless communication traffic and data storage requirements, the performance of error correction codes and data security solutions is become crucial. Random-like codes can be used in symmetric data encryption, cryptographic hash functions, random number/sequence generators, error correction and detection codes, and other data security applications. The present disclosure provides systems and methods that implement a dynamic permutation based coding approach of input based permutation/remapping/repositioning sequence generation. As the encoding process is defined using input bits, the output of the proposed codes depends on the statistic of input bits rather than any fixed predefined encoding structure. This dynamic encoding method can facilitate to implement strong confusion-diffusion logic and randomness in symmetric cryptography, hash functions, error correction codes, and other data security and authentication areas.

18 Claims, 18 Drawing Sheets

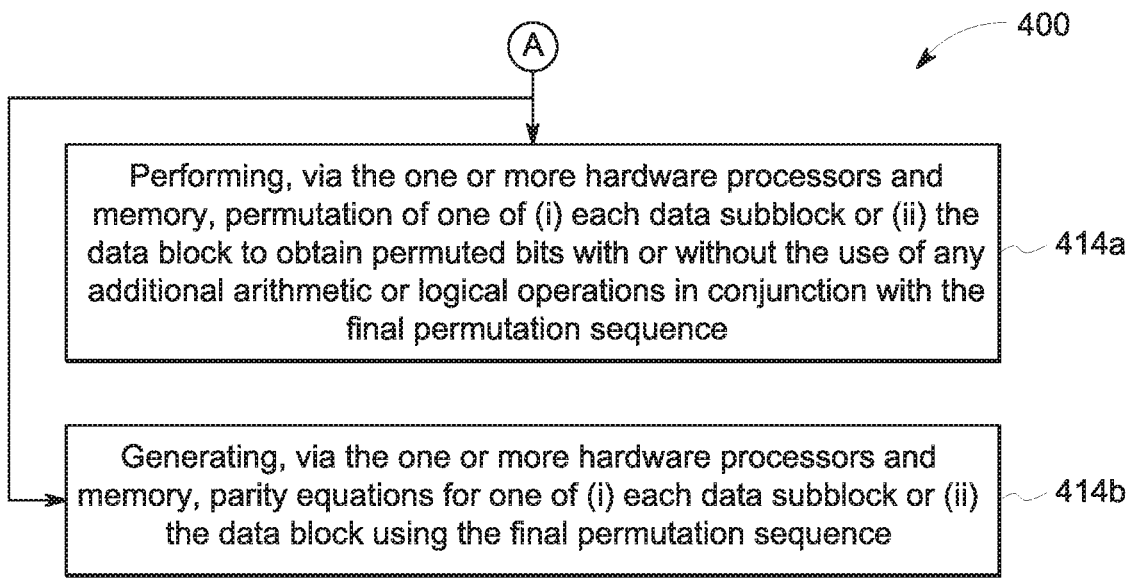

(A)

Performing, via the one or more hardware processors and memory, permutation of one of (i) each data subblock or (ii) the data block to obtain permuted bits with or without the use of any additional arithmetic or logical operations in conjunction with the final permutation sequence — 414a Generating, via the one or more hardware processors and memory, parity equations for one of (i) each data subblock or (ii) the data block using the final permutation sequence — 414b

FIG. 4B

| Bit position/ index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Sub-block-1 | 0 | 1 | 0 | 0 | 0 | 1 | 0 | 0 | 0 | 0 | 0 | 1 | 1 | 0 | 0 | 0 |
| Encoded/ encrypted bits | | | | | | | | | | | | | | | | |

FIG. 5

| Bit position/index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Data sub-block-1 | 0* | 1# | 0^ | 0@ | 0 | 1 | 0 | 0 | 0 | 0 | 0 | 1 | 1 | 0 | 0 | 0 |
| Encoded bits |  | 0^ |  |  | 0* | 1# |  |  | 0@ |  |  |  |  |  |  |  |

FIG. 7

| Bit position/index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Data sub-block-1 | 0* | 1 | 0 | 0 | 0# | 1 | 0 | 0 | 0$ | 0 | 0 | 1 | 1@ | 0 | 0 | 0 |
| Encoded bits |  | 0$ |  |  | 0* | 0# |  |  | 1@ |  |  |  |  |  |  |  |

FIG. 8

| Bit position/index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Data sub-block-1 | 0 | 1* | 0 | 0 | 0# | 1$ | 0 | 0 | 0@ | 0 | 0 | 1 | 1 | 0 | 0 | 0 |
| Encoded bits | 0# | | | | 1$ | | | | 1* | | | | 0@ | | | |

FIG. 9

| Bit position/index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Data sub-block-1 | 0 | 1* | 0 | 0 | 0# | 1$ | 0 | 0 | 0@ | 0 | 0 | 1 | 1 | 0 | 0 | 0 |
| Encoded bits | 0# | 1$ | 1* | 0@ | | | | | | | | | | | | |

FIG. 10

| Bit position/ index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Data sub-block-1 | 0* | 1 | 0# | 0@ | 0 | 1 | 0 | 0 | 0 | 0 | 0 | 1 | 1$ | 0 | 0 | 0 |
| Encoded bits | 0 | 1 | 1 | 0 | 0# | 0@ | 0* | 1$ | | | | | | | | |

FIG. 12

| Bit position (before) | Bit group 9:1 | Bit group 10:1 | Bit group 11:0 | Bit group 12:6 | Bit position (after) |
|---|---|---|---|---|---|
| 0 (Occupied) | | | | | 0 (Occupied) |
| 1 (Occupied) | Collision ↓ | Collision ↓ | Collision ↓ | | 1 (Occupied) |
| 2 (Occupied) | Collision ↓ | Collision ↓ | Collision ↓ | | 2 (Occupied) |
| 3 (Occupied) | Collision ↓ | Collision ↓ | Collision ↓ | | 3 (Occupied) |
| 4 (Occupied) | Collision ↓ | Collision ↓ | Collision ↓ | | 4 (Occupied) |
| 5 (Occupied) | Collision ↓ | Collision ↓ | Collision ↓ | | 5 (Occupied) |
| 6 | 6 | Collision ↓ | Collision ↓ | Collision ↓ | 6* (Occupied) |
| 7 | | 7 | Collision ↓ | Collision ↓ | 7 (Occupied) |
| 8 (Occupied) | | | Collision ↓ | Collision ↓ | 8 (Occupied) |
| 9 | | | 9 | Collision ↓ | 9 (Occupied) |
| 10 | | | | 10 | 10 (Occupied) |
| 11 | | | | | 11 |
| 12 (Occupied) | | | | | 12 (Occupied) |
| 13 | | | | | 13 |
| 14 | | | | | 14 |
| 15 | | | | | 15 |

FIG. 13

| Bit position/ index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Data sub-block-1 | 0 | 1 | 0 | 0 | 0 | 1 | 0@ | 0# | 0 | 0$ | 0* | 1 | 1$ | 0 | 0 | 0 |
| Encoded bits | 0 | 1 | 1 | 0 | 0 | 0 | 0 | 1 | 0@ | 0# | 0$ | 0* | | | | |

| Bit position (before) | Bit group 13:0 | Bit group 14:8 | Bit group 15:8 | Bit group 16:3 | Bit position (after) |
|---|---|---|---|---|---|
| 0 (Occupied) | Collision ↓ | | | | 0 (Occupied) |
| 1 (Occupied) | Collision ↓ | | | | 1 (Occupied) |
| 2 (Occupied) | Collision ↓ | | | | 2 (Occupied) |
| 3 (Occupied) | Collision ↓ | | | Collision ↓ | 3 (Occupied) |
| 4 (Occupied) | Collision ↓ | | | Collision ↓ | 4 (Occupied) |
| 5 (Occupied) | Collision ↓ | | | Collision ↓ | 5 (Occupied) |
| 6 (Occupied) | Collision ↓ | | | Collision ↓ | 6 (Occupied) |
| 7 (Occupied) | Collision ↓ | | | Collision ↓ | 7 (Occupied) |
| 8 (Occupied) | Collision ↓ | Collision ↓ | Collision ↓ | Collision ↓ | 8 (Occupied) |
| 9 (Occupied) | Collision ↓ | Collision ↓ | Collision ↓ | Collision ↓ | 9 (Occupied) |
| 10 (Occupied) | Collision ↓ | Collision ↓ | Collision ↓ | Collision ↓ | 10 (Occupied) |
| 11 | 11 | Collision ↓ | Collision ↓ | Collision ↓ | 11 (Occupied) |
| 12 (Occupied) | | Collision ↓ | Collision ↓ | Collision ↓ | 12 (Occupied) |
| 13 | | 13 | Collision ↓ | Collision ↓ | 13 (Occupied) |
| 14 | | | 14 | Collision ↓ | 14 (Occupied) |
| 15 | | | | 15 | 15 (Occupied) |

FIG. 15

| Data sub-block-1 bit position | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Encryption sequence | 4 | 2 | 6 | 11 | 5 | 3 | 7 | 13 | 1 | 0 | 9 | 14 | 8 | 12 | 10 | 15 |
| Decryption sequence for encrypted bits | 9 | 8 | 1 | 5 | 0 | 4 | 2 | 6 | 12 | 10 | 14 | 3 | 13 | 7 | 11 | 15 |

DYNAMIC PERMUTATION BASED CODING FOR GENERATING PERMUTED BITS AND PARITY EQUATIONS THEREOF

BACKGROUND

1. Field of the Invention

The present invention relates generally to encoding and decoding technique systems, and more specifically to systems and methods for dynamic permutation based coding for generating permuted bits and parity equations thereof.

2. Description of Related Art

With rapid increase in wired/wireless communication traffic and secure data storage requirements, performance of error detection and correction codes, and future-proof data security solutions have become crucial aspects. A good random-like codes can be used in symmetric data encryption, cryptographic hash functions, pseudo-random number and sequence generators, and error correction and detection codes. With the latest advancements in quantum computing and computational power, it has become extremely important to explore potential solutions to strengthen the data security.

Accordingly, although great strides have been made in the area of encoding and decoding technique systems, many shortcomings remain.

SUMMARY

In view of the foregoing, an embodiment herein provides systems and methods for dynamic permutation based coding for generating permuted bits and parity equations thereof. In one aspect, there is provided a processor implemented method for permutation based coding and generating permuted bits and parity equations thereof. The method comprises: receiving, via one or more hardware processors and interfaces, an input block of size 'n' bits and data block of size 'm' bits, where 'n' and 'm' are positive integer values; calculating, via the one or more hardware processors, number of bits required to represent all positions of one of (i) each data subblock or (ii) the data block based on at least one implementation type comprising one of a subblock level or a block level implementation; forming, via the one or more hardware processors and memory, 'm' number of bit groups of required bit size using the input block for the at least one implementation type; converting, via the one or more hardware processors and a memory, each bit group from 'm' number of bit groups formed into an equivalent decimal value; determining, via the one or more hardware processors and memory, one or more collision resolution rules with multiple step sizes for the at least one implementation type to resolve collisions occurring during a final permutation sequence derivation and to guarantee inclusion of all the bit positions in the final permutation sequence; deriving, via the one or more hardware processors and the memory, a final permutation sequence for one of (i) each data sub-block or (ii) the data block using the equivalent decimal values, the determined one or more collision rules and optional one or more arithmetic and logical operations, wherein the derived final permutation sequence comprises all corresponding data bit positions; and using the final derived permutation sequence, performing, via the one or more hardware processors and memory, one of: performing permutation of one of (i) each data subblock or (ii) the data block to obtain permuted bits with or without the use of any additional arithmetic and logical operations in conjunction with the final permutation sequence; or generating parity equations for one of (i) each data sub-block or (ii) the data block using the final permutation sequence.

In an embodiment, the permutated bits are used for implementation in an application type based on an actual assignment of the permuted bits.

In an embodiment, the step of forming, via the one or more hardware processors and memory, 'm' number of bit groups of required bit size is based on one of (i) predefined bit sets or (ii) dynamically derived bit sets, wherein 'm' number of bit groups comprising specific bit size are formed using at least one static or dynamically driven operation comprising a circular left or right shift operations of rows, a circular left or right shift operations of columns, a circular left or right shift operations of diagonal elements, a logical or arithmetic right or left shift of rows, a logical or arithmetic right or left shift of columns and a logical or arithmetic right or left shift of diagonal elements of one of (i) each input subblock or (ii) the input block.

In an embodiment, the step of determining, via the one or more hardware processors and memory, one or more collision resolution rules with multiple step sizes for the at least one implementation type is based on one of (i) one or more predefined multiple step sizes or (ii) one or more dynamically derived multiple step sizes using the input block.

In an embodiment, interdependencies between the final permutation sequence and input block is enhanced using at least one of (i) one or more arithmetic operations and (ii) one or more logical operations while deriving final permutation sequence and performing permutation of the data bits.

In an embodiment, the data block of size 'm' bits is retrievable using a decoding permutation sequence obtained from the final permutation sequence.

In an embodiment, the encoding steps to derive a final permutation sequence or encoded bits and successive decoding sequence for the at least one implementation type are performed iteratively to obtain higher dependencies between the input bits and encoded data bits.

In an embodiment, a value selected from equivalent decimal values or final permutation sequence is used to perform at least one operation comprising a circular left or right shift operations of rows, a circular left or right shift operations of columns, a circular left or right shift operations of diagonal elements, a logical or arithmetic right or left shift of rows, a logical or arithmetic right or left shift of columns and a logical or arithmetic right or left shift of diagonal elements of one of (i) each data subblock or (ii) the data block.

In an embodiment, the steps to derive a final permutation sequence or encoded bits are performed iteratively using at least one of one or more permutation sequence boxes, one or more substitution boxes and amalgamation with any existing cryptographic or hash function algorithms.

In another aspect, there is provided a system for permutation based coding and generating permuted bits and parity equations thereof. The system comprises: a memory storing instructions; one or more communication interfaces; and one or more hardware processors communicatively coupled to said memory through said one or more communication interfaces, wherein said one or more hardware processors are configured by said instructions to: receive an input block of size 'n' bits and data block of size 'm' bits, where 'n' and 'm' are positive integer values; calculate number of bits required to represent all positions of one of (i) each data subblock or (ii) the data block based on at least one implementation type comprising one of a subblock level or a block level implementation; form 'm' number of unique bit groups of required bit size using the input block for the at least one implementation type; convert each bit group from 'm' number of bit groups formed into an equivalent decimal value; determine one or more collision resolution rules with multiple step sizes for the at least one implementation type to resolve collisions occurring during a final permutation sequence derivation and to guarantee inclusion of all the bit positions in the final permutation sequence; derive a final permutation sequence for one of (i) each sub-block of the input block or (ii) the input block using the equivalent decimal values, the determined one or more collision rules and optional one or more arithmetic and logical operations, wherein the derived final permutation sequence comprises all corresponding data bit positions; and using the final permutation sequence, perform one of: perform permutation of one of (i) each data subblock or (ii) the data block to obtain permuted bits with or without the use of additional arithmetic and logical operations in conjunction with the final permutation sequence; or generate parity equations for one of (i) each data sub-block or (ii) the data block using the final permutation sequence.

In an embodiment, the permutated bits are used for implementation in an application type based on an actual assignment of the permuted bits.

In an embodiment, 'm' number of bit groups of required bit size are formed based on one of (i) predefined bit sets or (ii) dynamically derived bit sets, wherein 'm' number of bit groups comprising specific bit size are formed using at least one static or dynamically driven operation comprising a circular left or right shift operations of rows, a circular left or right shift operations of columns, a circular left or right shift operations of diagonal elements, a logical or arithmetic right or left shift of rows, a logical or arithmetic right or left shift of columns and a logical or arithmetic right or left shift of diagonal elements of one of (i) each input subblock or (ii) the input block.

In an embodiment, the one or more collision resolution rules with multiple step sizes for the at least one implementation type are determined based on one of (i) one or more predefined multiple step sizes or (ii) one or more dynamically derived multiple step sizes using the input block.

In an embodiment, interdependencies between the final derived permutation sequence and input block is enhanced using at least one of (i) one or more arithmetic operations and (ii) one or more logical operations while deriving final permutation sequence and performing permutation of the data bits.

In an embodiment, the data block of size 'm' bits is retrievable using a decoding permutation sequence obtained from the final permutation sequence.

In an embodiment, the encoding steps to derive a final permutation sequence or encoded bits and successive decoding sequence for the at least one implementation type are performed iteratively to obtain higher dependencies between the input bits and encoded data bits.

In an embodiment, a value selected from equivalent decimal values or final permutation sequence is used to perform at least one operation comprising a circular left or right shift operations of rows, a circular left or right shift operations of columns, a circular left or right shift operations of diagonal elements, a logical or arithmetic right or left shift of rows, a logical or arithmetic right or left shift of columns and a logical or arithmetic right or left shift of diagonal elements of one of (i) each data subblock or (ii) the data block.

In an embodiment, the steps to derive a final permutation sequence or encoded bits are performed iteratively using at least one of one or more permutation sequence boxes, one or more substitution boxes and amalgamation with any existing cryptographic or hash function algorithms.

Other and further aspects and features of the disclosure will be evident from reading the following detailed description of the embodiments, which are intended to illustrate, not limit, the present disclosure.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 4A and 4B depict a flow diagram illustrating a processor implemented method of dynamic permutation based coding technique for permuted bits generation and parity equations thereof in accordance with an embodiment of the present application;

FIG. 5 depicts a table illustrating a method of sub-block 1 implementation used in the system of FIGS. 4A and 4B in accordance with an embodiment of the present application;

FIG. 7 depicts a table illustrating an example of a permutation approach in accordance with an embodiment of the present application;

FIG. 8 depicts a table illustrating an example of predefined data sub-block bit positions being remapped to encoded positions in accordance with an embodiment of the present application;

FIG. 9 depicts a table illustrating an example of predefined positions of encoded bits being populated with the data sub-block bits contained using the final permutation sequence in accordance with an embodiment of the present application;

FIG. 10 depicts a table illustrating an example of the first four bit positions being populated with the data sub-block bits dictated by final permutation sequence derived from the first set of input bit groups in accordance with an embodiment of the present application;

FIG. 12 depicts a table illustrating encoded data bits after processing first two sets of input bit groups in accordance with an embodiment of the present application;

FIG. 13 depicts a table illustrating a deriving final permutation sequence for input bit groups 9 through 12 in a sequential manner in accordance with an embodiment of the present application;

FIG. 14 depicts a table illustrating encoded data bits after processing first three sets of input bit groups in accordance with an embodiment of the present application;

FIG. 15 depicts a table illustrating deriving final permutation sequence for bit groups 13 through 16 in a sequential manner in accordance with an embodiment of the present application;

Figure 1:
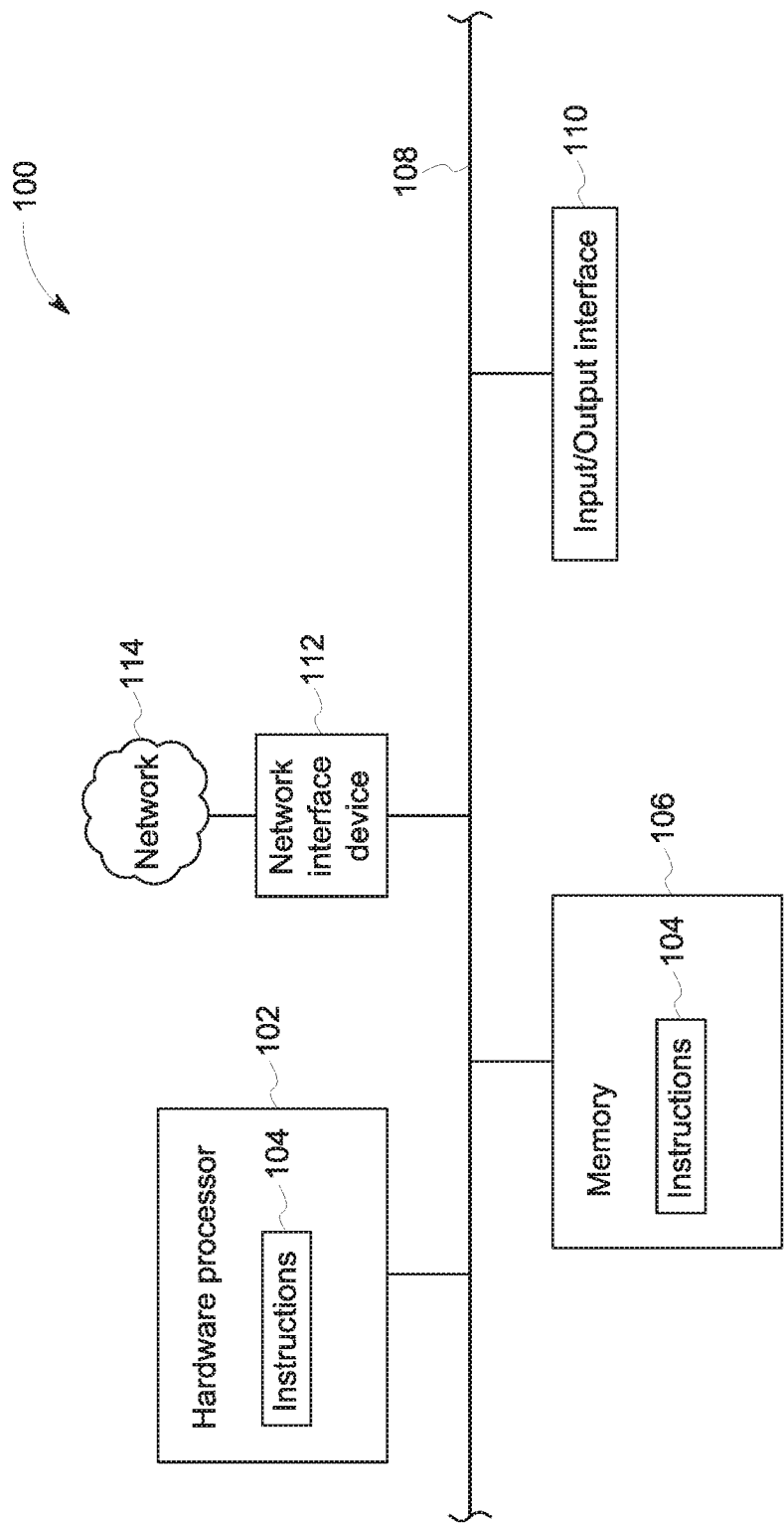
FIG. 1 is a block diagram illustrating a system for dynamic permutation based coding for generating permuted bits and parity equations thereof according to an embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional encoding and decoding technique systems. Specifically, the system of the present invention facilitates the implementation of strong confusion-diffusion logic and randomness in symmetric cryptography, hash functions, error correction codes, and other data security and authentication areas. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

In present dynamic permutation based coding, data block is permutated/repositioned/remapped at block level or sub-block level, where subblocks are smaller size blocks derived by subdivisions of the main block, using the final permutation sequence derived from the equivalent decimal values, obtained from the input bit groups, and one or more collision resolution rules. The expression "sub-block" can be referred as "subblock" and may be interchangeably used herein.

The present disclosure utilizes the bits and bit patterns of the input block, i.e., information block, message block, secret key block, or round key block to derive input based permutation sequence to encode the data bits. The permutated data bits can directly be used as encoded bits, encrypted bits or can be used to derive dynamic parity equations depending on the application requirements. Here, the term dynamic is used in the context of permutation sequence and one or more sets of arithmetic and logical criteria derived using the bits and bit patterns of the input block. This core concept of input based permutation introduces the randomness and nonlinearity in the encoded or encrypted bits. Multiple rounds of proposed dynamic permutation based coding enhances the randomness and provides a strong foundation for cryptographic hash functions, symmetric encryption, error correction and detection codes, and pseudo random number generators.

Referring now to the drawings wherein like reference characters identify corresponding or similar elements throughout the several views, FIG. 1 depicts a block diagram of a system for generating encoded bits and parity equations thereof in accordance with a preferred embodiment of the present application. It will be appreciated that system 100 overcomes one or more of the above-listed problems commonly associated with conventional encoding and decoding technique systems.

In the contemplated embodiment, system 100 includes at least one hardware processors 102 with or without instructions 104, a memory 106 with or without instructions 104, an input/output (I/O) interface 110, and a network interface device 112, which communicate with each other via a bus 108. Instructions 104 may reside, completely or at least partially, within the hardware processor 102 and/or memory 106 during execution thereof by system 100. Instructions 104 may include directions for storing instructions, performing one or more functions, and the like. For example, instructions 104 may include detecting one or more files to perform one or more methodologies described herein.

System 100 also includes a network interface device 112 which facilitates communication with other computing systems (not shown in FIG. 1) via one or more networks 114. Other computing systems, for example, may include conventional computing devices as described above, internet connected devices/systems, or an external storage such as a server, or a cloud computing system.

System 100 may also be referred to as "an encoding system or permuted bit generation system". System 100 may be implemented as any of a variety of conventional computing devices, including, for example, servers, a desktop PC, a notebook or portable computer, a workstation, a mainframe computer, an entertainment device, cellular phones, smart phones, personal digital assistants (PDAs), portable computers, desktop computers, a field-programmable gate array device, a microcontroller, tablet computers, phablets, an internet appliance, a transceiver, a printing machine (also referred as a printer, or a printing device), a scanning machine, a photocopier machine (also referred as a photocopy machine), communication receivers, data encryption drives, and the like.

It is contemplated and will be appreciated that system 100 may include one or more memory units, one or more hardware processors, and one or more I/O interfaces.

It is also contemplated and will be appreciated that memory 106 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. Memory 106 further includes one or more modules (not shown in FIG. 1) to perform the methodologies described herein.

It is likewise contemplated and will be appreciated that memory 106 may include input block and data block of various bit sizes.

It is also contemplated and will be appreciated that network 114 may be a wireless network, a wired network, or a combination thereof. Network 114 may also be an individual network or a collection of many such individual networks, interconnected with each other and functioning as a single large network, e.g., the Internet or an intranet. Network 114 may be implemented as one of the different types of networks, such as intranet, local area network (LAN), wide area network (WAN), the internet, near field communication (NFC), and such. Additionally, network 114 may either be a dedicated network or a shared network, which represents an association of the different types of networks that use a variety of protocols. Furthermore, network 114 may include network devices, such as network switches, hubs, routers, host bus adapters (HBAs), for providing a communication link between system 100 and other connected devices and/or systems.

It is also contemplated and will be appreciated that the I/O interface 110 may include a variety of software and hardware interfaces (e.g., a web interface, a graphical user interface, and the like). The I/O interface 110 may allow the system 100 to interact with a user directly or through the user devices. Additionally, the I/O interface 110 may enable system 100 to communicate with other computing devices (not shown in FIG. 1), such as web servers and external data servers, or cloud computing systems.

It is likewise contemplated and will be appreciated that the I/O interface 112 can facilitate multiple communications within a wide variety of networks and protocol types, including wired networks, for example, LAN, cable, etc., and wireless networks, such as WLAN, cellular, or satellite. Furthermore, the I/O interface 110 may include one or more ports for connecting a number of devices to one another or to another server.

Figure 2:
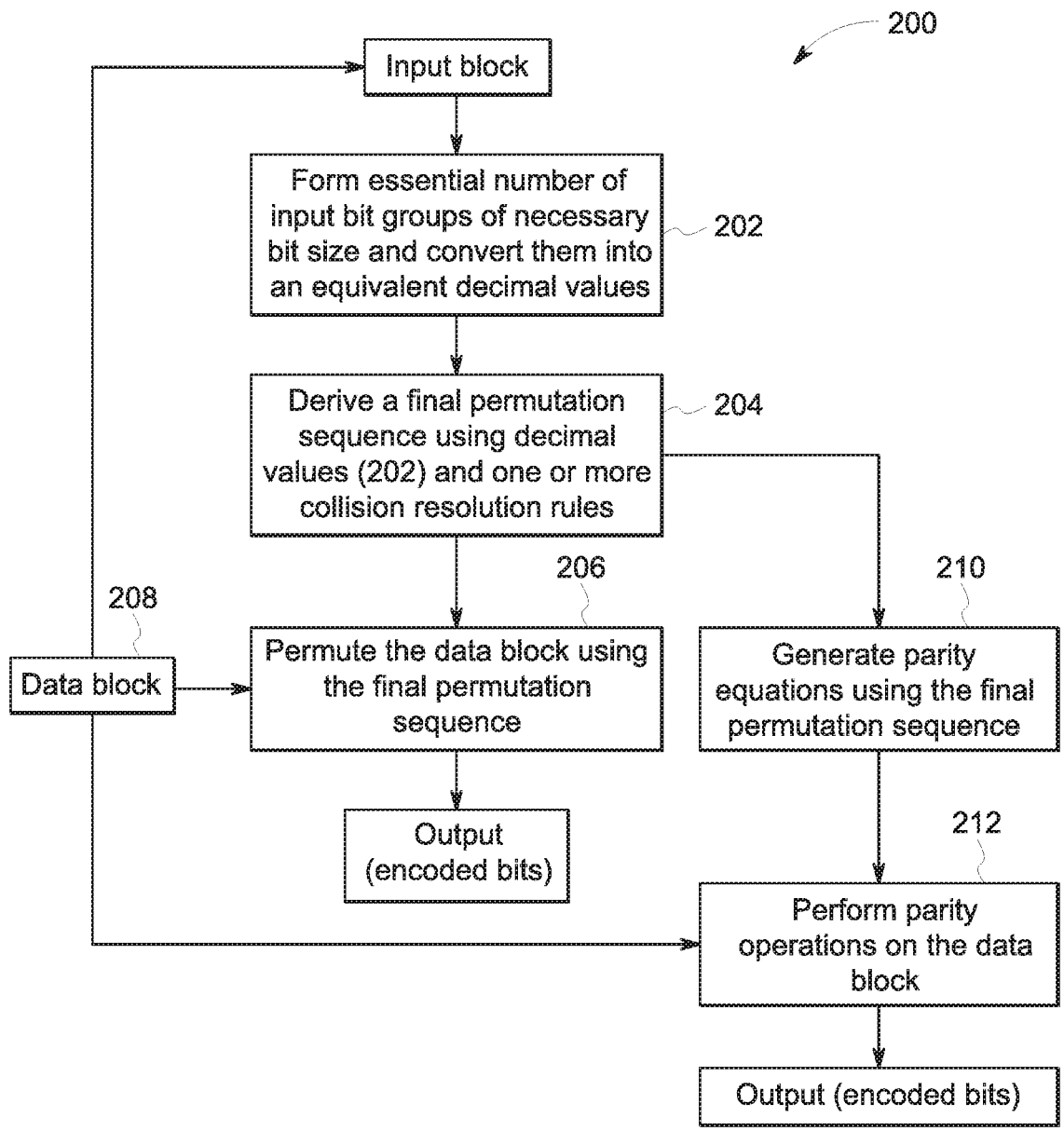
FIG. 2 depicts a high-level exemplary flow diagram illustrating a processor implemented method of dynamic permutation based coding for generating encoded bits and encrypted bits according to an embodiment of the present application.
Figure 3A:
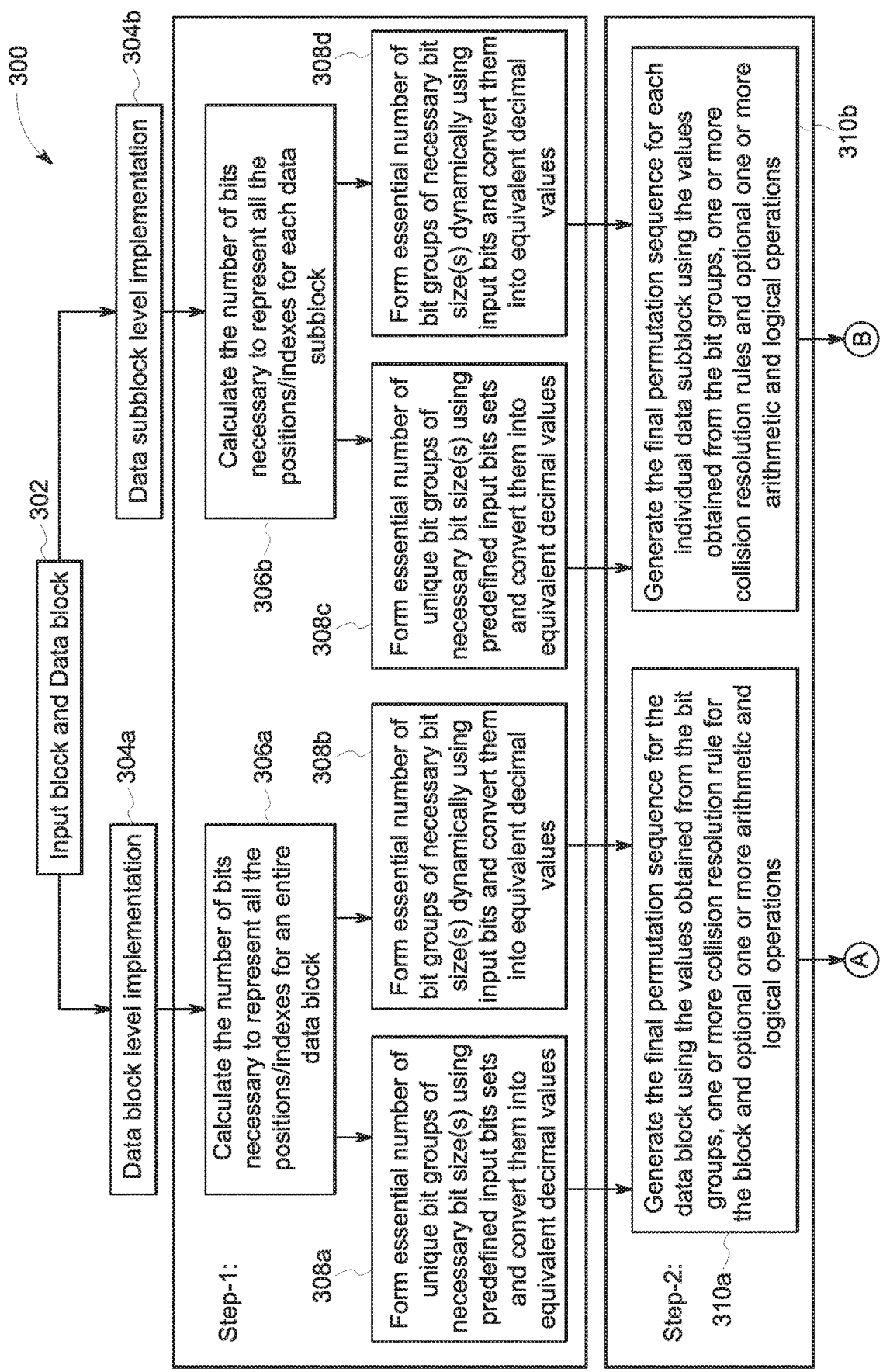
FIGS. 3A-3B depict exemplary flow diagrams illustrating a processor implemented method of dynamic permutation based coding for generating encoded bits, encrypted bits, and parity equations for a given data block using block level implementation or sub-block level implementation in accordance with an embodiment of the present application.
Figure 3B:
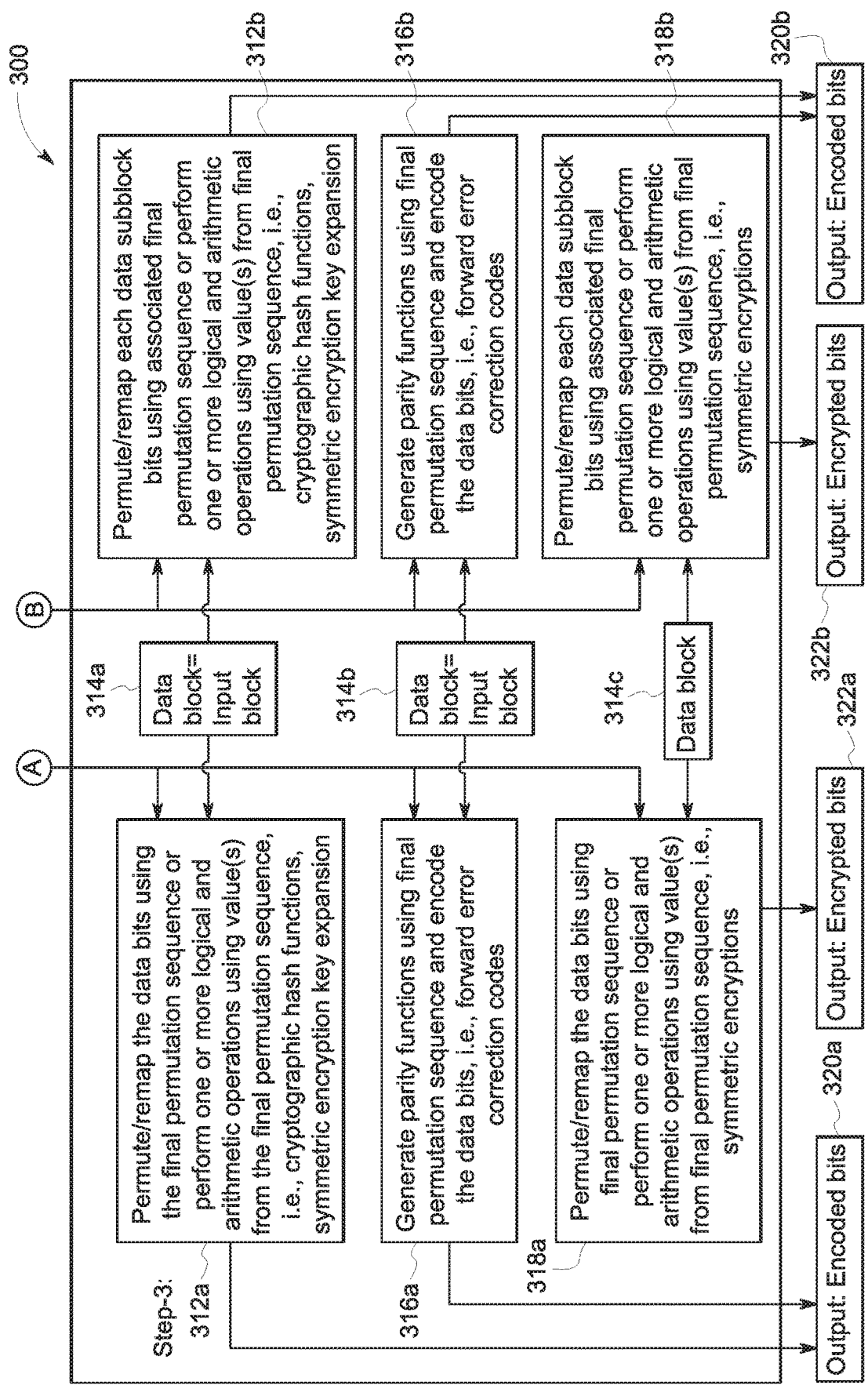

FIGS. 2, 3A, 3B, 4A, and 4B, with reference to FIG. 1, are exemplary flow diagrams illustrating a processor implemented method for generating encoded/permuted bits according to an embodiment of the present disclosure. More specifically, FIGS. 1 and 2 depicts a high-level exemplary flow diagram illustrating a processor implemented method 200 for generating encoded bits and encrypted bits according to an embodiment of the present disclosure. FIGS. 3A and 3B depict exemplary flow diagrams illustrating a processor implemented method 300 of dynamic permutation based coding for generating encoded bits, encrypted bits, and parity equations for a given data block using block level implementation or sub-block level implementation in accordance with an embodiment of the present disclosure. As shown, methods 200 and 300 comprise of three main steps: forming essential number of bit groups with necessary bit size(s) using input bits and converting them into equivalent decimal values 202, 306a-308d; deriving final permutation sequence using equivalent decimal values and one or more collision resolution rules 204, 310a-310b; system 100 performing permutation/remapping/repositioning of the data block using the final permutation sequence to generate the encoded output 206, 312a-318b. The final permutation sequence from step 204 can be used to generate input dependent parity equations as shown in step 210. These parity equations can then be used to perform parity operations on the data block to generate encoded output as shown in step 212. In step 206, permutated data bits can be used directly as encoded bits or as encrypted bits depending on the application requirements. Depending on the application area, the data block may be distinct or same as the input block as shown in step 208. Dynamic coding of the present disclosure can be applied on any block size. An example of proposed dynamic permutation based coding, together with other constructive suggestions, is elucidated in the present disclosure and figures described herein. Dynamic coding technique can be implemented for different number systems, for example, binary, decimal, octal, and hexadecimal. Essential steps of the proposed dynamic coding technique in a binary number system are shown in FIGS. 3A-3B. However, same steps can be implemented for other number systems by replacing the bit notation with appropriate digits/symbols or by converting that number system into binary number system to obtain encoded output.

The steps of the method of the present disclosure will now be explained with reference to the components of the system 100 as depicted in FIG. 1 and FIGS. 2, 3A, 3B, 4A, and 4B. The hardware processor 102 is configured by the instructions 104 stored in the memory 106. At step 402, the hardware processor 102 via interface(s) receives an input block of size 'n' bits and data block of size 'm' bits 402, where 'n' and 'm' are positive integer values. The input block of size 'n' bits and data block of size 'm' bits are received as depicted in FIGS. 2, 3A and B. In the present disclosure, coding technique for encoding data bits can be performed using an entire data block or using a smaller size data sub-blocks. Coding performed over an entire block size provides better randomization at the cost of complexity. However, the selection between block and sub-block level implementations shall depend on application requirements and available hardware resources. Sub-block based implementation is comparatively faster as multiple sub-blocks can be processed in parallel.

For instance, at step 402 and 302, assuming the following identical 32 bit input block and data block: 0100 0100 0001 1000 0100 0100 0001 1000. Here 'n' and 'm' are the same.

At step 404, the hardware processor 102 calculates number of bits required to represent all positions of the data block for block level 304a implementation or sub-block level 304b implementation. In other words, hardware processor 102 calculates the number of bits required representing all positions of one of (i) each data sub-block or (ii) the data block based on at least one implementation type comprising one of a sub-block level or a block level implementation. Minimum number of bits are calculated which are needed to represent all the positions of the data block depending on sub-block level 306b or block level 306a implementation, i.e., 16 bits block or sub-block needs 4 bits to represent all the bit positions. Bit size of the data block and input block is mostly identical but it can be different depending on the application areas. At step 406, 'm' number of bit groups of required bit size are formed using the input block for the at least one implementation type. Steps 404 and 406 are better understood by the following description.

Creating necessary number of bit groups using input block can either be performed using predefined bit sets at sub-block level 308c or block level 308a or can be performed dynamically at sub-block level 308d or block level 308b. Bit groups created using predefined bit sets can guarantee uniqueness of each bit group, i.e., no two bit groups are identical. In one embodiment, one or more logical and arithmetic operations, i.e., a circular left or right shift operations of rows, a circular left or right shift operations of columns, a circular left or right shift operations of diagonal elements, a logical or arithmetic right or left shift of rows, a logical or arithmetic right or left shift of columns and a logical or arithmetic right or left shift of diagonal elements, can be performed on the input block or input sub-blocks to create necessary number of bit groups as discussed in the example in the present disclosure.

In dynamic approach, step 308b and 308d, values obtained from predefined or dynamically defined input bit sets can be used to perform the logical operations, i.e., a circular left or right shift operations of rows, a circular left or right shift operations of columns, a circular left or right shift operations of diagonal elements, a logical or arithmetic right or left shift of rows, a logical or arithmetic right or left shift of columns and a logical or arithmetic right or left shift of diagonal elements, on the input block or input sub-blocks while forming necessary number of bit groups, i.e., value read from first four input bits or dynamically derived input bits set (assuming 16 bits block or sub-block) can be used to perform circular left shift while deriving the bit groups. In the dynamic approach, one or more bit groups may be repeated multiple times, i.e., two or more bit groups, derived using the input block, may be identical. However, dynamically formed bit groups provide better randomization and diffusion property (among confusion and diffusion properties).

Referencing now to FIG. 5 while continuing discussion over FIGS. 2, 3A, 3B, 4A, and 4B along with reference to FIG. 1, sub-block-1 table 500 employed by step 304b is shown. As discussed in step 304b, for data subblock level implementation the 32 bits input block is divided into two 16 bits sub-blocks: 0 to 15 and 16 to 31. This partitioning of sub-blocks can also be performed using some predefined interleaver sequence and a different portioning size. At step 404 and 306b, the hardware processor 102 calculated the number of bits required to represent all 16 positions: 16 positions require 4 bits. The two 16 bits sub-blocks are denoted as:

Input sub-block-1: 0100 0100 0001 1000; and Input sub-block-2: 0100 0100 0001 1000

A blank array of 1*16 is used to store the encoded bits. First four bit groups are formed using input sub-block-1 (307 and 406) as follows: Bit group 1: 0100 (bit 0 to 3), bit group 2: 0100 (bit 4 to 7), bit group 3: 0001 (bit 8 to 11), bit group 4: 1000 (bit 12 to 15). Bit positions can also be numbered starting from 1 instead of 0 by adding an offset value of 1 during equivalent decimal value conversion.

At step 408, the one or more hardware processors 102 convert each bit group from 'm' number of unique bit groups formed into an equivalent decimal value. At step 410, the one or more hardware processors 102 determine one or more collision resolution rules for the at least one implementation type to resolve collisions occurring during a final permutation sequence derivation. In an embodiment of the present disclosure, the step of determining the one or more collision resolution rules for the at least one implementation type is realized using one of (i) one or more fixed (predefined) multiple step sizes or (ii) one or more dynamically derived multiple step sizes. In dynamic approach, the multiple step sizes are assigned using the values read from predefined or dynamically derived input bit groups. Here, the term dynamic is used in the context of values and bit groups derived using the bits and bit patterns of the input block.

At step 412, the one or more hardware processors 102 derive a final permutation sequence for one of (i) each data sub-block or (ii) the data block using the equivalent decimal values and the determined one or more collision resolution rules, wherein the derived final permutation sequence comprises all the corresponding data bit positions. Steps 408 through 412 can be better understood by way of following description: these equivalent decimal values are used as rearrangement or remapping positions in deriving final permutation sequence and hence also referred as rearrangement positions and may be interchangeably used hereafter. For given example:

Bit group 1: 0100=4
Bit group 2: 0100=4
Bit group 3: 0001=1
Bit group 4: 1000=8

Rearrangement positions for final permutation sequence are identified using the bits groups from step 308c and 408. Final permutation sequence containing all the bit positions/indexes of data block is derived using these rearrangement positions and one or more collision resolution rules 410. Rules are set to resolve the collision, which may happen while deriving the final permutation sequence, to guarantee inclusion of all the bit positions/indexes of the data block for sub-block level implementation or block level implementation.

At step 412, 310a and 310b final permutation sequence that includes all bit positions/indexes, for respective sub-block level or block level implementation, is derived using the rearrangement positions obtained from the input bit groups. In deriving final permutation sequence using one or more collision resolution rules, the assignment of rearrangement positions in the final permutation sequence can be performed in a straightforward and sequential manner, i.e., the value read from the first bit group occupies the zero position/index in final permutation sequence, value read from the second bit group occupies the first position/index in final permutation sequence, value read from the third bit group occupies the second position/index in the final permutation sequence, value read from the fourth bit group occupies the third position/index in the final permutation sequence, and so on. The selection of rearrangement positions assignment sequence and its subsequent position/index allotment in the final permutation sequence can be determined by predefined or dynamically derived orders, i.e., first the value read from the third bit group occupies the fourth position/index in final permutation sequence, then value read from the fifth bit group occupies the first position/index in final permutation sequence, and so on, wherein the term dynamic is used in the context of rearrangement positions assignment sequence and its subsequent position/index allotment derived using the bits and bit patterns of the input block. Collision may occur in the process of deriving the final permutation sequence, i.e., two or more rearrangement positions read from bit groups are identical.

Collision resolution rules are set at step 410, 310a and 310b, to guarantee inclusion of all the bit positions in final permutation sequence for respective data sub-block level implementation or data block level implementation. In one embodiment, if two rearrangement positions, derived from input bit groups, are identical, increment the subsequent rearrangement positions using multiple step sizes, i.e., use step size X, Y, and Z once in a sequential manner for consecutive collisions and finally keep incrementing by step size 1 until an unoccupied position is attained; truncate the value to stay within block size, i.e., if the block size is 16 (0-15) bits and the projected rearrangement position after applying collision resolution rule is 18, then this value will translate into bit position 1 (18−16=2) as bit count starts with number zero. Any number of step sizes can be used to form one or more collision resolution rules. These multiple step sizes can either be fixed values, i.e., X=3, Y=5, and Z=7, or can be derived dynamically for an entire block, portions of main block, or individual sub-blocks. In order to obtain step sizes dynamically, any predefined or dynamically derived input bit groups can be used, i.e., step size X can be defined using an equivalent decimal value obtained from predefined input bits [1, 2, 3, 4] or dynamically derived bit group, step size Y can be defined using an equivalent decimal value obtained from predefined input bits [5, 6, 7, 8] or dynamically derived bit group, step size Z can be defined using an equivalent decimal value obtained from predefined input bits [1, 5, 7, 9] or dynamically derived bit group. In sub-block based implementation, multiple step size values can also be selected from the final permutation sequence of the previous sub-block except the first sub-block. In general, dynamically selected multiple step sizes will provide better randomness than fixed values. In the given example, a simple collision resolution rule is used; if two rearrangement positions are identical, increment the subsequent value using step size 1, equivalent to having all multiple step sizes of value 1, until an unoccupied position is attained. In the given example, bit group 1 occupies bit position 4. Bit group 2 represents rearrangement position 4 which is already occupied, hence its value is incremented by step size 1 until an unoccupied bit position is attained as shown in the following:

Bit group 1: 0100=4
Bit group 2: 0100=4 (occupied)=4+1=5
Bit group 3: 0001=1
Bit group 4: 1000=8

Final permutation sequence obtained from the first set of input bit groups=[4, 5, 1, 8]

Figure 6:
FIG. 6 depicts a table illustrating a method of deriving final permutation sequence for bit groups 1 through 4 in a sequential manner in accordance with an embodiment of the present application.

Referencing now to FIG. 6 while continuing discussion over FIGS. 2, 3A, 3B, 4A, and 4B along with reference to FIG. 1, table 600 of deriving final permutation sequence for bit groups 1 through 4, in a sequential manner, is shown. As can be seen from the 'Bit Position (Before)' column of table 600, all the bit positions are available at the start. Occupied bit positions after step 2 are marked as occupied in the 'Bit Position (After)' column.

Alternatively, one or more arithmetic and logical operations can be used during the final permutation sequence generation at step 412, 310a and 310b, to further randomize the final permutation sequence, e.g., new values can be generated using the progressive addition to derive final permutation sequence instead of using raw rearrangement positions derived from the input bit groups as shown in the following:

Bit group 1: 0100=4 Modified group 1=Bit group 1=4
Bit group 2: 0100=4 Modified group 2=Modified group 1+Bit group 2=4+4=8
Bit group 3: 0001=1 Modified group 3=Modified group 2+Bit group 3=8+1=9
Bit group 4: 1000=8 Modified group 4=Modified group 3+Bit group 4=9+8=17=0 (as block size is 16; 17 will translate into 17−16=1=bit number 0 as range of 0-15 is considered).

In cases of collision, follow the same collision resolution rule. In this implementation all the bit groups are providing unique values. Hence, the final permutation sequence obtained using the first set of bit groups=[4, 8, 9, 0]. It is to be understood by a person having ordinary skill in the art or skilled in the art that there can be many different possible conceptualizations of arithmetic linking among the rearrangement positions while deriving the final permutation sequence for block level implementation and sub-block level implementation.

Deriving final permutation sequence using the raw rearrangement positions and one or more collision resolution rules from step 402 through 412 may be performed with or without the use of one or more arithmetic and logical operations for the block level implementation and sub-block level implementation, as illustrated in the example for the sub-block level implementation. However, all the conceptualizations of sub-block level implementation discussed in the present disclosure can be realized for the block level implementation by considering virtual partitioning of the block. Use of arithmetic and logical operations enhances the interdependencies between the final permutation sequence and input bits at the cost of complexity. In other words, interdependencies between the final derived permutation sequence and bits in the input block is enhanced using at least one of (i) one or more arithmetic operations and (ii) one or more logical operations while deriving the final permutation sequence.

For sub-block based implementation 310b, final permutation sequence of each sub-block can either be treated independently or can be combined with its neighboring sub-block using simple arithmetic operations to enhance the inter dependencies.

In order to introduce the interdependency among the final permutation sequences of the sub-blocks at step 412, raw rearrangement positions generated from the input bit groups from steps 402 through 406 are modified, excluding the first sub-block. Here, few or all of the values of the final permutation sequence of the previous sub-block can be added to the raw rearrangement positions for the next sub-block. In this case, rearrangement positions to generate a final permutation sequence of any sub-block Y, where Y is greater than 1, will be modified by adding the final permutation sequence values of the previous sub-block (Y−1), and steps 408 through 412 use these modified rearrangement positions to derive the final permutation sequence for sub-block Y. Interdependency among the final permutation sequences of sub-blocks can also be realized after the final permutation sequences are derived, by repeating step 2 on each modified final permutation sequence, e.g., final permutation sequence of sub-block-2 can be modified by adding it with the final permutation sequence of any other sub-block, and new final permutation sequence for sub-block-2 can be calculated by performing step 2 of the encoding process on this modified final permutation sequence. The encoded bits generated using this intertwine logic will provide good randomization. However, for interdependent sub-blocks, each sub-block cannot be processed concurrently, leading to a sequential execution of the sub-blocks encoding.

Referring now to FIG. 7 while continuing discussion over FIGS. 2, 3A, 3B, 4A, and 4B along with reference to FIG. 1, table 700 depicting an example of a possible permutation approach is shown. Once a final permutation sequence is obtained for a part of data sub-block, an entire data sub-block, or an entire data block the actual permutation/repositioning of the data block 206 can be performed in several different ways. Some of these possible permutation approaches are listed below for the data sub-block level implementation. However, it can also be implemented at the data block level implementation as data block can be imagined as a large size data sub-block. First four bits (0 to 3) of the data sub-block are remapped to encoded positions in a sequential manner using the final permutation sequence [4, 5, 1, 8], obtained from the first set of bit groups, as illustrated in table 700. Next four bits (4 to 7) of the data sub-block are likewise remapped based on positions obtained from the final permutation sequence derived from second set of bit groups and so on. In other words, the hardware processor 102 remaps the data bits, using final permutation sequence, a plurality of bits from each bit group of the each data sub-block or data block to encoded bit positions, defined by the final permutation sequence, to obtain an encoded data block comprising a plurality of encoded bits. The same is depicted in step 206 of FIG. 2 and step 312a, 312b, 318a and 318b of FIG. 3B. The permutation of the data block can be performed at individual sub-block level or at the block level depending on the implementation types.

For the sake of brevity and better understanding of how the encoded bits are generated, the reposition of these bits are indicated by way of associated symbols (*, #, ^, and @). For instance, in table 700, bit 0 of the data sub-block-1 goes to encoded bit position 4, bit 1 of the data sub-block-1 goes to encoded bit position 5, bit 2 of the data sub-block-1 goes to encoded bit position 1, and bit 3 of the data sub-block-1 goes to encoded bit position 8.

Referring now to FIG. 8, table 800 depicting an example of predefined data sub-block bit positions being remapped to encoded positions is shown. Here, predefined sub-block bit positions, i.e., 0, 4, 8 and 12 are remapped to the positions obtained from final permutation sequence [4, 5, 1, 8]. Bit 0 of the data sub-block goes to encoded bit position 4, bit 4 of the data sub-block goes to encoded bit position 5, bit 8 of the data sub-block goes to encoded bit position 1, and bit 12 of the data sub-block goes to encoded bit position 8.

Referring now to FIG. 9, table 900 depicting an example of predefined positions of encoded bits being populated with the data sub-block bits obtained using the final permutation sequence is shown. Here, predefined encoded bit positions, i.e., 0, 4, 8 and 12 are populated by the data sub-block-1 bit positions, obtained from the final permutation sequence [4, 5, 1, 8]. Bit 4 of the data sub-block-1 goes to encoded bit position 0, bit 5 of the data sub-block-1 goes to encoded bit position 4, bit 1 of the data sub-block-1 goes to encoded bit position 8, and bit 8 of the data sub-block-1 goes to encoded bit position 12.

Referring now to FIG. 10, table 1000 depicting an example of the first four bit positions being populated with the data sub-block bits dictated by final permutation sequence derived from the first set of input bit groups is shown. Next four encoded bit positions (4 to 7) will be populated using the data sub-block bits dictated by final permutation sequence derived from the second set of input bit groups, and so on. Here, bit 4 of the data sub-block-1 goes to encoded bit position 0, bit 5 of the data sub-block-1 goes to encoded bit position 1, bit 1 of the data sub-block-1 goes to encoded bit position 2, and bit 8 of the data sub-block-1 goes to encoded bit position 3. This permutation/repositioning scheme is used for the given example hereon.

It is contemplated and will be appreciated that the step of forming bit groups may include performing circular shift on input block or input sub-block level to generate necessary number of bit groups for each data sub-block or the data block. The following illustrates this method:

Shifted input sub-block-1: Input sub-block-1: 0100 0100 0001 1000

0010 0010 0000 1100 (right circular shift by 1 position)
Bit group 5: 0010=2
Bit group 6: 0010=2
Bit group 7: 0000=0
Bit group 8: 1100=12

The following illustrates derivation of final permutation sequence using the rearrangement values from second bit groups:

Bit group 5: 0010=2
Bit group 6: 0010=2 (occupied)=2+1=3
Bit group 7: 0000=0
Bit group 8: 1100=12

Final permutation sequence obtained from the second set of input bit groups=[2, 3, 0, 12].

Figure 11:
FIG. 11 depicts a table illustrating a deriving final permutation sequence for input bit groups 5 through 8 in a sequential manner in accordance with an embodiment of the present application.

Referring now to FIG. 11, table 1100 depicting a deriving final permutation sequence for input bit groups 5 through 8, in a sequential manner, is shown. Here, 'Bit Position (Before)' represents the occupied bit positions from the final permutation sequence of previous bit groups, i.e., bit group 1 through 4.

Referring now to FIG. 12, table 1200 depicting encoded data bits after processing first two sets of input bit groups is shown. Circular shift is performed on the input bits to generate next set of bit groups and the steps above are repeated to find the final permutation sequence and encoded bits. The following shows this method:

Input sub-block-1: 0100 0100 0001 1000
Shifted input sub-block-1: 0001 0001 0000 0110 (right circular shift by 2 positions)
Bit group 9: 0001=1 (occupied)=1+1=2 (occupied)=2+1=3 (occupied)=3+1=4 (occupied)=4+1=5 (occupied)=5+1=6
Bit group 10: 0001=1 (occupied)=1+1=2 (occupied)=2+1=3 (occupied)=3+1=4 (occupied)=4+1=5 (occupied)=5+1=6 (occupied)=6+1=7

Bit group 11: 0000=0 (occupied)=0+1=1 (occupied)=1+1=2 (occupied)=2+1=3 (occupied)=3+1=4 (occupied)=4+1=5 (occupied)=5+1=6 (occupied)=6+1=7 (occupied)=7+1=8 (occupied)=8+1=9

Bit group 12: 0110=6 (occupied)=6+1=7 (occupied)=7+1=8 (occupied)=8+1=9 (occupied)=9+1=10

Final permutation sequence obtained from the third set of input bit groups=[6, 7, 9, 10].

FIG. 13 presents table 1300 depicting a deriving final permutation sequence for input bit groups 9 through 12, in a sequential manner.

FIG. 14 presents table 1400 depicting encoded data bits after processing first three sets of input bit groups. Circular shift operation is performed on the input bits to generate more bit groups and the steps above are repeated to find the final permutation sequence as shown in the following:

Input sub-block-1: 0100 0100 0001 1000

Shifted input sub-block-1: 0000 1000 1000 0011 (right circular shift by 3 positions)

Bit group 13: 0000=0 (occupied)=0+1=1 (occupied)=1+1=2 (occupied)=2+1=3 (occupied)=3+1=4 (occupied)=4+1=5 (occupied)=5+1=6 (occupied)=6+1=7 (occupied)=7+1=8 (occupied)=8+1=9 (occupied)=9+1=10 (occupied)=10+1=11

Bit group 14: 1000=8 (occupied)=8+1=9 (occupied)=9+1=10 (occupied)=10+1=11 (occupied)=11+1=12 (occupied)=12+1=13

Bit group 15: 1000=8 (occupied)=8+1=9 (occupied)=9+1=10 (occupied)=10+1=11 (occupied)=11+1=12 (occupied)=12+1=13 (occupied)=13+1=14

Bit group 16: 0011=3 (occupied)=3+1=4 (occupied)=4+1=5 (occupied)=5+1=6 (occupied)=6+1=7 (occupied)=7+1=8 (occupied)=8+1=9 (occupied)=9+1=10 (occupied)=10+1=11 (occupied)=11+1=12 (occupied)=12+1=13 (occupied)=13+1=14 (occupied)=14+1=15

Final permutation sequence obtained from the fourth set of input bit groups=[11, 13, 14, 15].

FIG. 15 presents table 1500 depicting deriving final permutation sequence for bit groups 13 through 16, in a sequential manner.

Figure 16:
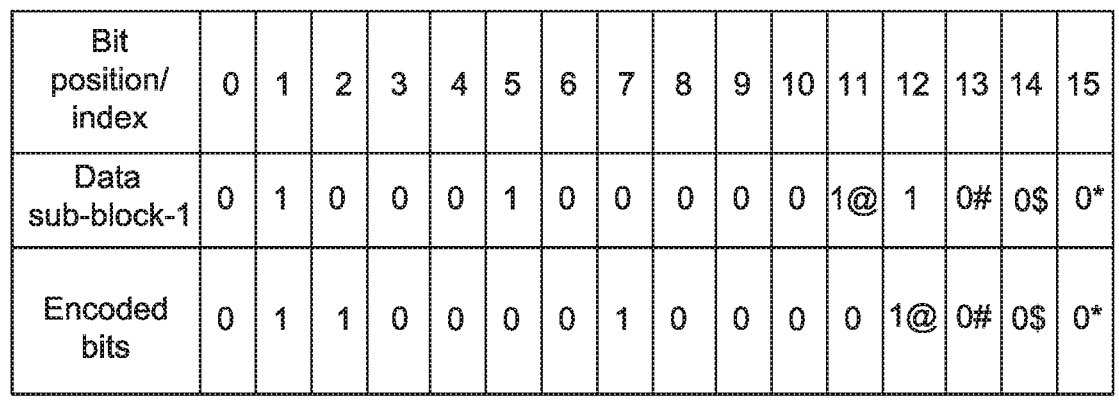
FIG. 16 depicts a table illustrating encoded bits after processing last set of input bit groups in accordance with an embodiment of the present application.

FIG. 16 presents table 1600 depicts encoded bits after processing last set of input bit groups. Hence, the final encoded bits for data sub-block-1 are: 0 1 1 0 0 0 0 1 0 0 0 0 1 0 0 0

Data Sub-block-1: 0100 0100 0001 1000

Encoded Bits: 0110 0001 0000 1000

Here, the final permutation sequence for data sub-block-1 after step-2 for given example is: [4, 5, 1, 8, 2, 3, 0, 12, 6, 7, 9, 10, 11, 13, 14, 15].

Same steps are/may be followed for sub-block-2 to find the final permutation sequence. It should be understood by a person having ordinary skill in the art or person skilled in the art that sub-block-2 also provides the same final permutation sequence as sub-block-1, if encoded independently, as both the sub-blocks are identical. This independent encoding of sub-block-2 can be imagined as initial state with all zeros. However, with intertwined logic, final permutation sequence of sub-block-2 will be different than that of sub-block-1, as the final permutation sequence of sub-block-1 or any other sub-block modifies the rearrangement positions or final permutation sequence of the sub-block-2.

Alternatively, in its simplest form of dynamic permutation based coding implementation, values obtained from any predefined positions/indexes of the final permutation sequence can be used to perform one or more logical and arithmetic operations comprising simple arithmetic operations, a circular left or right shift operations of rows, a circular left or right shift operations of columns, a circular left or right shift operations of diagonal elements, a logical or arithmetic right or left shift of rows, a logical or arithmetic right or left shift of columns and a logical or arithmetic right or left shift of diagonal elements of one of (i) each data subblock or (ii) the data block in steps 312*a*, 312*b*, 318*a* and 318*b* irrespective of block level implementation or subblock level implementation to generate encoded or encrypted bits 320*a*, 320*b*, 322*a* and 322*b*. In other words, for given example, a value 12 is obtained from a preselected position 8 of the final permutation sequence, which can be used to perform circular left shift operation on data subblock-1 or any other data sub-block.

Figure 4A:
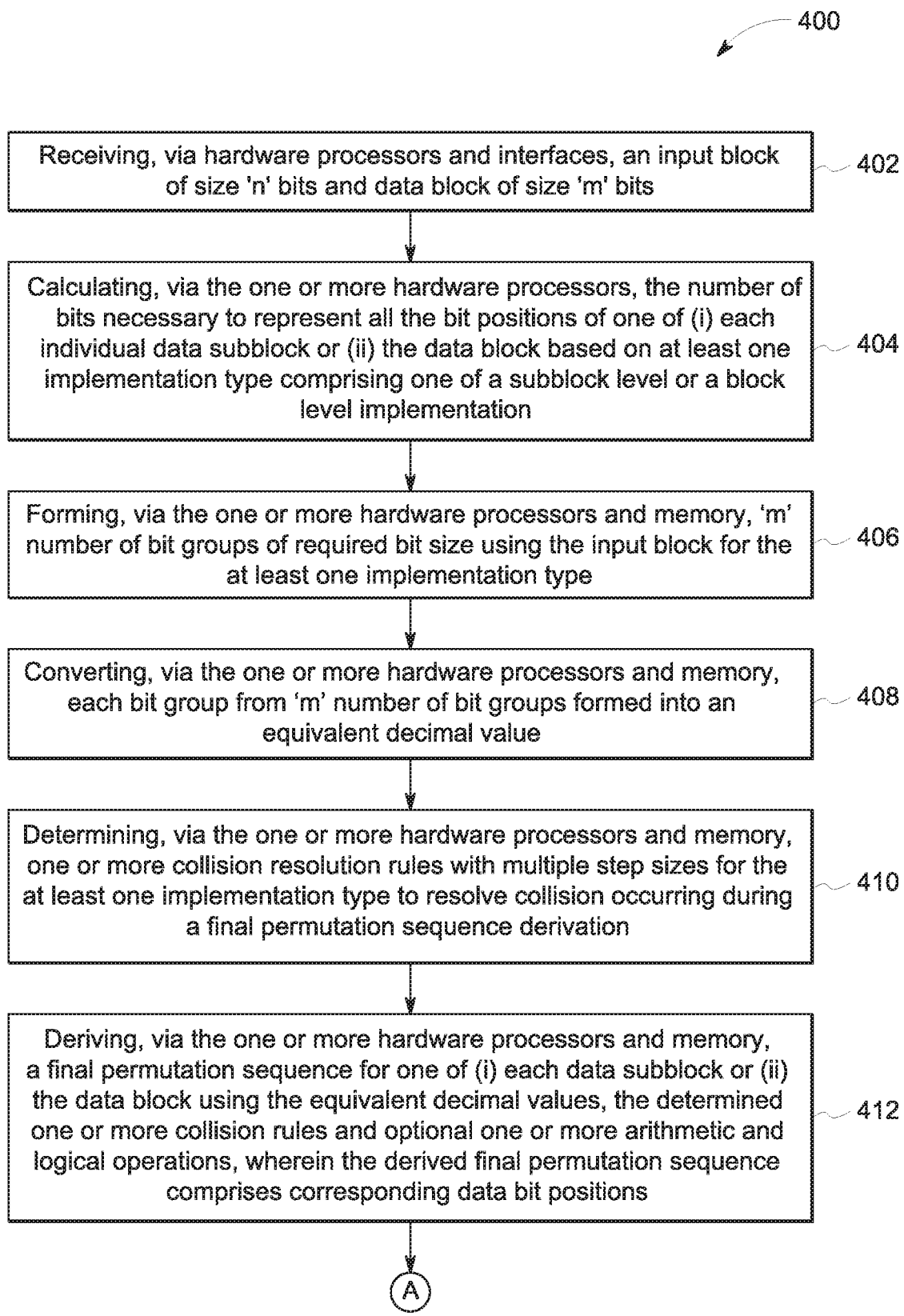

This final permutation sequence can be used to derive input dependent parity equations in step 414*b*, 314*b*, 316*a* and 316*b*, e.g., first parity bit can be function of input bits [4, 5, 1, 8], second parity bit can be function of input bits [2, 3, 0, 12], third parity bit can be function of input bits [6, 7, 9, 10], fourth parity bit can be function of input bits [11, 13, 14, 15], and so on. These parity equations are used to perform the encoding of the input bits in steps 320*a* and 320*b*. In other words, one or more parity equations may be generated using the encoded data block comprising the plurality of encoded bits. For instance, permutation of one of (i) each data sub-block or (ii) the data block may be performed to obtain permuted bits with or without the use of additional arithmetic and logical operations to obtain permuted bits as depicted in step 414*a*. Alternatively at step 414*b*, parity equations may be generated for one of (i) each data subblock or (ii) the data block as depicted in FIGS. 4A and 4B.

When dynamic permutation based coding as described above by the present disclosure is used in symmetric data encryption applications and other similar applications, it becomes necessary to generate the decryption sequence to retrieve the original data.

Figure 17:
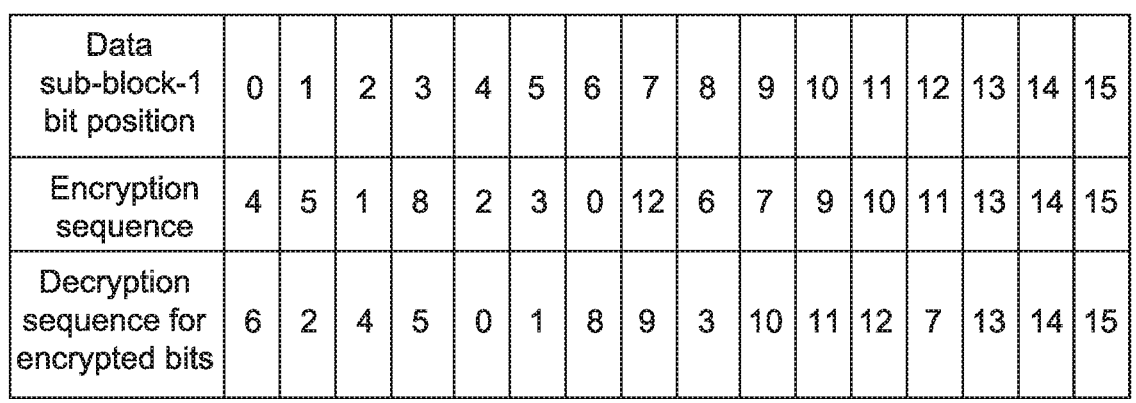
FIG. 17 depicts a table illustrating an example of an encryption sequence and a decryption sequence in accordance with an embodiment of the present application.
Figures 18, 19:
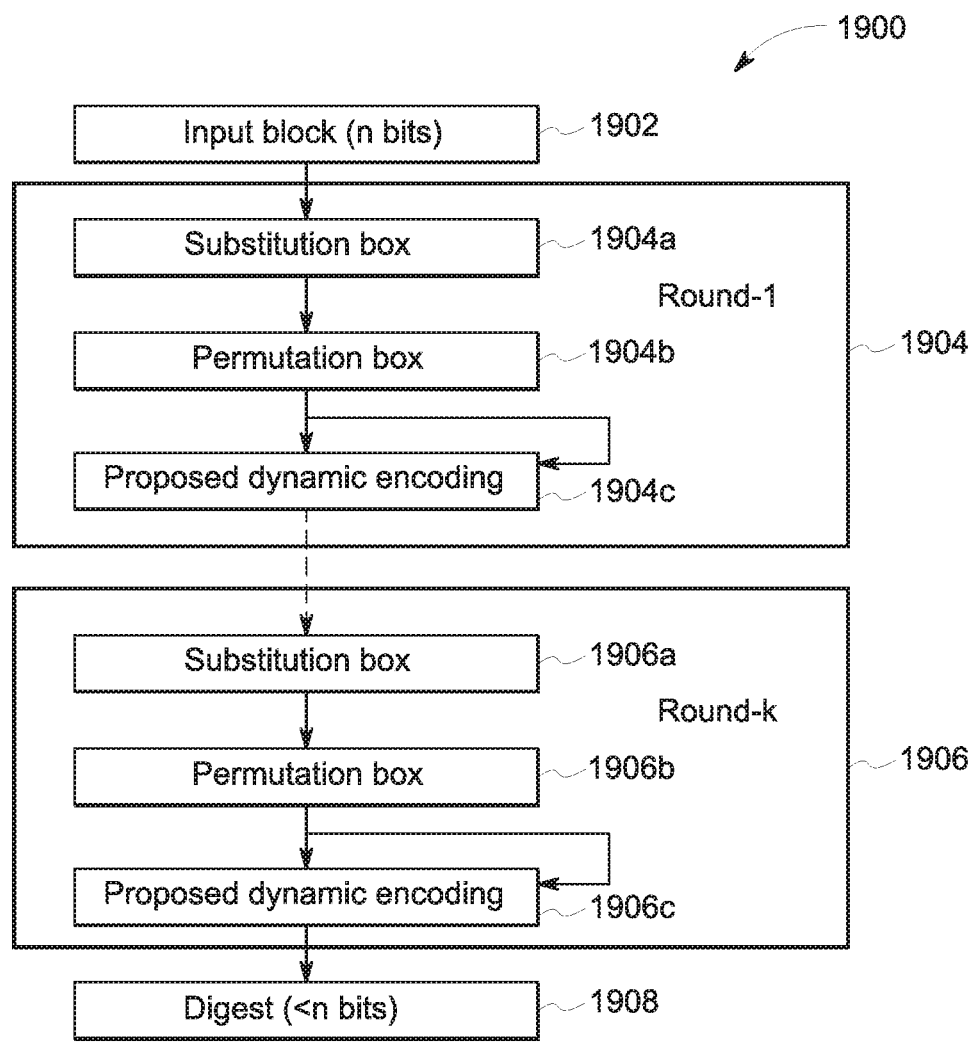
FIG. 18 depicts a table illustrating another example of an encryption sequence and a decryption sequence in accordance with an embodiment of the present application.
FIG. 19 depicts dynamic coding technique implemented by the system of FIG. 1 for cryptographic hash function generation in accordance with an embodiment of the present application.

FIGS. 17 and 18 present tables 1700 and 1800, respectfully, of different encryption sequences and respective decryption sequences using the final permutation sequence of the example above. Once the encryption permutation sequence is derived from the final permutation sequence, the decryption permutation sequence becomes self-apparent as shown in FIGS. 17 and 18. If the key is not known to the adversary and appropriate confusion-diffusion logic is implemented, it becomes very difficult (almost impossible) for the adversary to find the decryption sequence. In other words, a decoding sequence may be generated for the encoded data block comprising the plurality of encoded bits.

Figure 20:
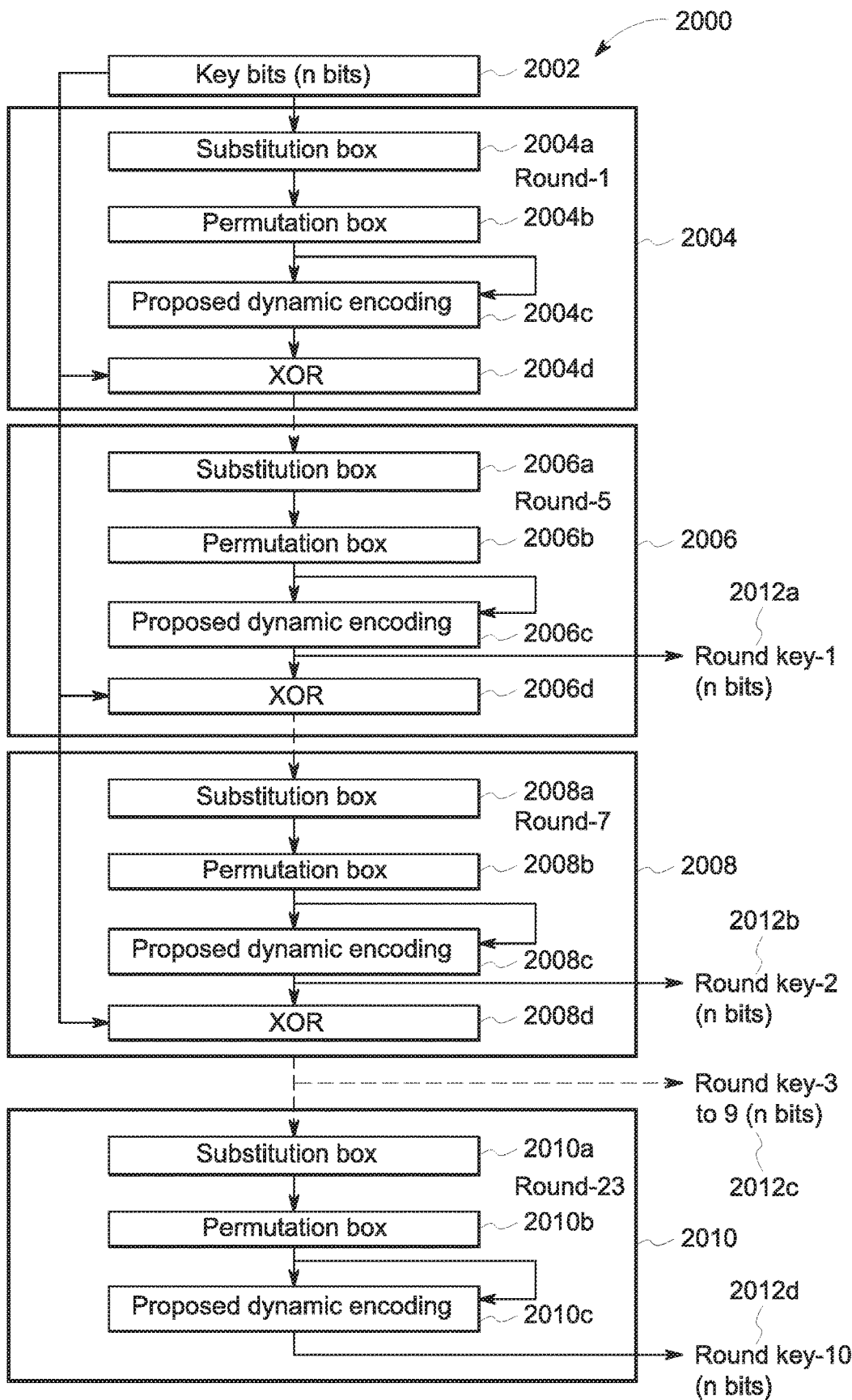
FIG. 20 depicts dynamic coding technique implemented by the system of FIG. 1 for key expansion application in accordance with an embodiment of the present application.
Figure 21:
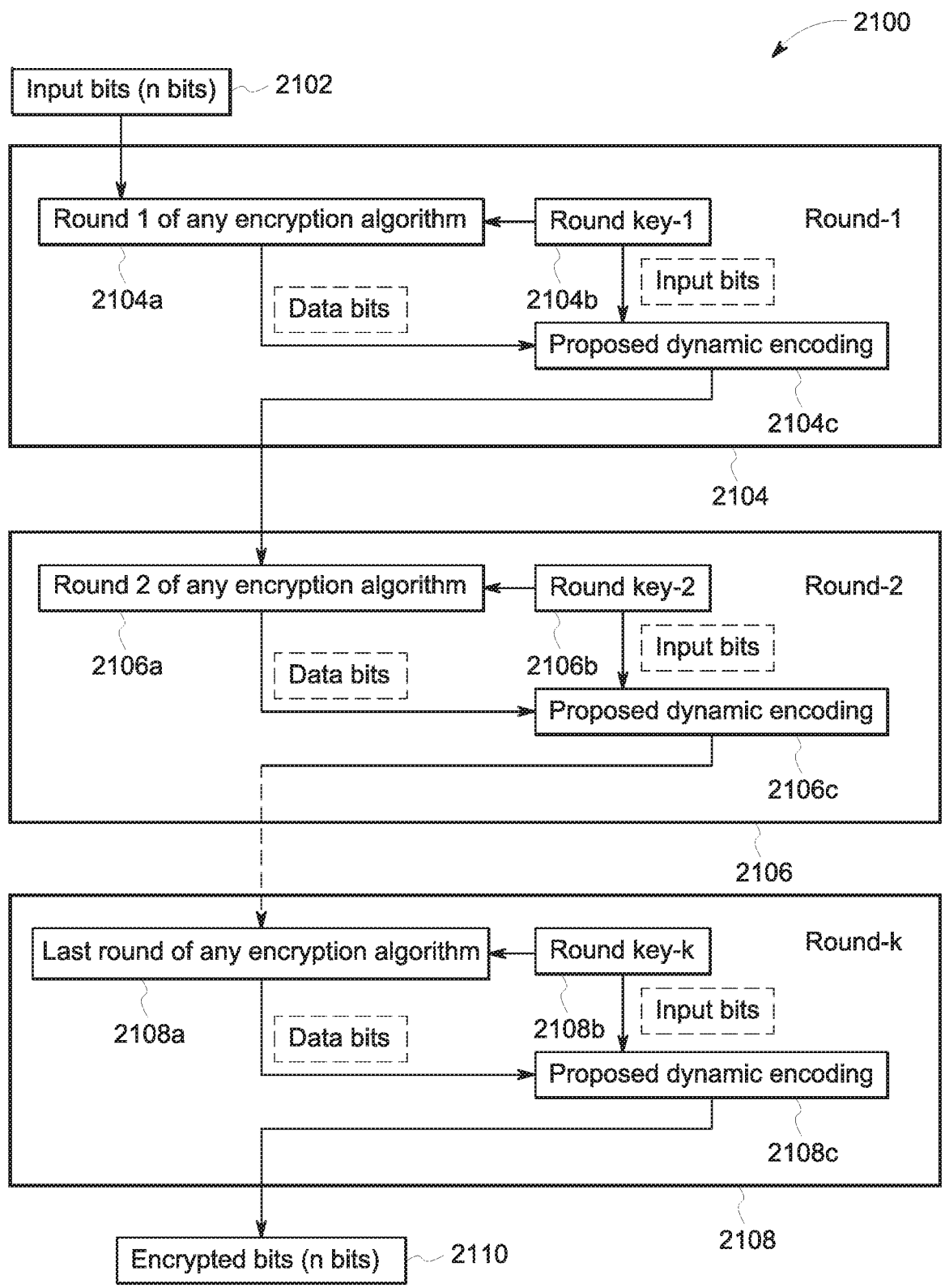
FIG. 21 depicts dynamic coding technique implemented by the system of FIG. 1 for symmetric data encryption in accordance with an embodiment of the present application.

Referring now to FIGS. 19 through 21, implementation of system 100 in various applications in accordance with an embodiment of the present disclosure is shown. More specifically, FIG. 19, with reference to FIGS. 1 through 4, depicts dynamic encoding technique 1900 implemented by the system 100 of FIG. 1 for cryptographic hash function generation in accordance with an embodiment of the present disclosure. FIG. 19 represents possible embodiment of the dynamic coding technique 1900 for cryptographic hash function application for a block size of 'n bits' and 'k' number of rounds. Here, an embodiment of the present disclosure with identical data block and input block is used. As can be seen from the FIG. 19, each round consists three main processes: substitution (e.g., 1904*a* and 1906*a*), permutation (e.g., 1904*b* and 1906*b*) and proposed dynamic encoding (e.g., 1904*c* and 1906*c*). Permutation and substitution steps facilitate the implementation of diffusion property. As shown, substitution boxes 1904*a* and 1906*a* and permutation boxes 1904*b* and 1906*b* help destroy any statistical relationship between the input bits and the digest. Output of the permutation process serves as an input block for the proposed dynamic coding 1904c and 1906c, and step 206 of FIG. 2 is performed with a data block identical to the input block. Any existing or simple substitution box and permutation box can be employed. The dynamic coding of the present disclosure can either be implemented at block level or sub-block level. After performing 'k' number of iterations 1906 over block size 'n', the message/input digest of desired size can be extracted. Size of the digest will be less than the input block size 1908. It is apparent that multiple rounds of the configuration provide strong one-way function, i.e., once the input bits are permutated using the final permutation sequence several times during the process, it becomes almost impossible to retrieve the original input bits from the digest.

FIG. 20, with reference to FIGS. 1A through 4, depicts dynamic coding technique implemented by system 100 of FIG. 1A for key expansion application in accordance with an embodiment of the present disclosure. FIG. 20 represents possible embodiment of the dynamic coding technique 2000 for key expansion, a crucial process in symmetric encryption. It is almost identical to the dynamic coding technique 1900 in FIG. 19 (e.g., n bits 2002; substitution boxes 2004a, 2006a, 2008a, and 2010a; permutation boxes 2004b, 2006b, 2008b, and 2010b; and proposed dynamic encoding 2004c, 2006c, 2008c, and 2010c), except it has an additional step of XOR operation (e.g., 2004d, 2006d, 2008d, and 2010d) after proposed dynamic encoding (e.g., 2004c, 2006c, 2008c, and 2010c). Dynamic coding technique 2000 inherits the property of one-way function discussed above. Round keys (e.g., 2012a, 2012b, 2012c, and 2012d) can be extracted starting round-5 2006 and every second round after that, i.e., 7, 9, 11, 13, etc. FIG. 20 shows generation of 10 round keys 2012d using the session/main key. First few rounds are needed to destroy/eliminate/filter any statistical pattern of the session key and relationship between session key and round keys. Round keys 2012 are set apart by two rounds to provide better statistical isolation between the round keys. One can also use more rounds to set apart two consecutive round keys 2012.

FIG. 21, with reference to FIGS. 1 through 4, depicts dynamic coding technique 2100 implemented by system 100 of FIG. 1 for symmetric data encryption in accordance with an embodiment of the present disclosure. In the dynamic coding technique 2100 for symmetric data encryption, the session key is known to both the users and the data is exchanged in an encrypted format. Multiple round keys are derived from the session key. These round keys can be used to derive the key based permutation sequences using one or more iterations of proposed dynamic coding. These permutation sequences can then be used to encrypt the data bits 2110 of their respective rounds. FIG. 21 represents such an embodiment of the dynamic coding technique 2100 for symmetric data encryption. As can be seen from FIG. 21, any known symmetric encryption algorithm or simple combination of permutation box and substitution box can be used in conjunction with the dynamic coding of the present disclosure to enhance the confusion-diffusion properties. Here, round key (e.g., 2104b, 2106b, and 2108b) is used as input block for the proposed dynamic coding (e.g., 2104c, 2106c, and 2108c) to derive final permutation/remapping sequence and step 206 of the dynamic coding of FIG. 2 is performed on the output bits of that individual encryption round, i.e., data block is replica of output of individual encryption rounds (e.g., 2104a, 2106a, and 2108a). Step 206 of the dynamic coding of FIG. 2 encrypts the data block, output from the known or simple encryption algorithm, using the final permutation sequence of step 204 of FIG. 2. When used in symmetric data encryption it is necessary to generate the decryption sequence to retrieve the original data. However, once the encryption sequence is derived, the decryption sequence becomes self-apparent. Alternatively, individual round keys or the main key can be modified by cascading it with the digests of the round keys or main key and first few message bits to derive a larger input block (stronger) to generate final permutation sequence that strengthens the security of the subsequent message transmission. It is almost similar to increasing the key size/security for the subsequent message blocks.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "generating" or "monitoring" or "calculation" or "performing" or "deriving" "or receiving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A processor implemented method for permutation based coding and generating permuted bits and parity equations thereof, the method comprising:

receiving, via one or more hardware processors and one or more interfaces, an input block of size 'n' bits and a data block of size 'm' bits, wherein 'n' and 'm' are positive integers, wherein the data block is permuted at a block level or subblock level using the particulars of the input block at a block level or subblock level respectively;

calculating, via the one or more hardware processors, a number of bits required to represent the size of data block for one of (i) block level or (ii) subblock level implementation, wherein the size for block level implementation is 'm' and size for subblock level implementation is 'm/l' bits, wherein 'l' is a positive integer such that 'm/l' is an integer;

forming, via the one or more hardware processors and a memory, 'm' number of bit groups, to bring about permutation sequences for all the positions in the data block, of a predetermined bit size using the input block for the at least one implementation type, wherein the bit size 'b' of each bit group for block level implementation is determined such that $(m/(2^b)) \leq 1$ and for subblock level implementation it is determined such that $((m/l)/(2^b)) \leq 1$;

converting, via the one or more hardware processors and the memory, the 'm' bit groups into equivalent decimal values using any standard number system conversion method like doubling method or positional notation method;

determining, via the one or more hardware processors and the memory, one or more collision resolution rules with multiple step sizes for the at least one implementation type to resolve collisions occurring during a final permutation sequence derivation;

deriving, via the one or more hardware processors and the memory, a final permutation sequence for one of (i) each data subblock or (ii) the data block using the converted decimal values, the determined one or more collision resolution rules and modulo arithmetic, wherein the derived final permutation sequence comprises all corresponding data bit positions distinctly, wherein the converted decimal values, in conjunction with modulo arithmetic, are used sequentially to denote distinct positions in the final permutation sequence and collisions occurred, while using a converted decimal value to represent a distinct position in the final permutation sequence, are handled by adding the next available step size value, of the multiple steps, to the subsequent colliding value and step size 1 is repeated at the end, if all the multiple step sizes are used and collision still persist, until a value representing a distinct position in the final permutation sequence is attained; and using the final permutation sequence, performing, via the one or more hardware processors and the memory, one of:
  performing, via the one or more hardware processors and memory, permutation of one of (i) each data subblock or (ii) the data block to obtain permuted bits using the final permutation sequence; or
  generating, via the one or more hardware processors and the memory, parity equations for one of (i) each data subblock or (ii) the data block using the final permutation sequence.

2. The processor implemented method as claimed in claim 1, wherein the permutated bits are used for implementation in an application type based on an actual assignment of the permuted bits.

3. The processor implemented method of claim 1, wherein the data block of size 'm' bits is retrievable, via the one or more hardware processors and the memory, using a decoding permutation sequence obtained from the final permutation sequence for all implementation types.

4. The processor implemented method as claimed in claim 3, wherein the step of forming, via the one or more hardware processors and the memory, 'm' number of bit groups of required bit size is based on one of (i) predefined bit sets or (ii) dynamically derived bit sets, wherein 'm' number of bit groups comprising specific bit size are formed using at least one static or dynamically driven operation comprising a circular left or right shift operations of rows, a circular left or right shift operations of columns, a circular left or right shift operations of diagonal elements, a logical or arithmetic right or left shift of rows, a logical or arithmetic right or left shift of columns and a logical or arithmetic right or left shift of diagonal elements of one of (i) each input subblock or (ii) the input block.

5. The processor implemented method as claimed in claim 4, wherein the step of determining, via the one or more hardware processors and the memory, one or more collision resolution rules with multiple step sizes for the at least one implementation type is based on one of (i) one or more predefined multiple step sizes or (ii) one or more dynamically derived multiple step sizes using the input block.

6. The processor implemented method as claimed in claim 5, wherein interdependencies between the final permutation sequence and input block is enhanced using at least one of (i) one or more arithmetic operations and (ii) one or more logical operations while deriving final permutation sequence and performing permutation of the data bits.

7. The processor implemented method as claimed in claim 5, further comprising:
  iteratively performing the encoding steps to derive a final permutation sequence or encoded bits and successive decoding sequence for the at least one implementation type to obtain higher dependencies between the input bits and encoded data bits.

8. The processor implemented method as claimed in claim 7, wherein a value selected from the converted decimal values or final permutation sequence is used to perform at least one operation comprising a circular left or right shift operations of rows, a circular left or right shift operations of columns, a circular left or right shift operations of diagonal elements, a logical or arithmetic right or left shift of rows, a logical or arithmetic right or left shift of columns and a logical or arithmetic right or left shift of diagonal elements of one of (i) each data subblock or (ii) the data block.

9. The processor implemented method as claimed in claim 8, wherein the steps to derive a final permutation sequence or encoded bits are performed iteratively using at least one of one or more permutation sequence boxes, one or more substitution boxes and amalgamation with any existing cryptographic or hash function algorithms.

10. A system for generating encoded bits and parity equations thereof comprising:
  a memory for storing instructions;
  one or more communication interfaces; and
  one or more hardware processors communicatively coupled to said memory through said one or more communication interfaces;
  wherein said one or more hardware processors are configured by said instructions to:
    receive an input block of size 'n' bits and data block of size 'm' bits, wherein 'n' and 'm' are positive integers, wherein the data block is permutated at a block level or subblock level using the particulars of the input block at a block level or subblock level respectively;
    calculate a number of bits required to represent the size of data block for one of (i) block level or (ii) subblock level implementation, wherein the size for block level implementation is 'm' bits and size for subblock level implementation is 'm/l' bits, wherein 'l' is a positive integer such that 'm/l' is an integer;
    form a 'm' number of bit groups of a predetermined bit size using the input block for the at least one implementation type, wherein the bit size 'b' of each bit group for block level implementation is determined using a standard method such that $(m/(2^b)) \leq 1$ and for subblock level implementation it is determined such that $((m/l)/(2^b)) \leq 1$;
    convert the 'm' number of bit groups into equivalent decimal values using any standard number system conversion method;
    determine one or more collision resolution rules with multiple step sizes for the at least one implementation type to resolve collisions occurring during a final permutation sequence derivation;
    derive a final permutation sequence for one of (i) each data subblock or (ii) the data block using the converted decimal values, the determined one or more collision resolution rules and modulo arithmetic, wherein the derived final permutation sequence comprises all the corresponding data bit positions distinctly, wherein the converted decimal values, in conjunction with modulo arithmetic, are used sequentially to denote distinct positions in the final permutation sequence and collisions occurred, while using a converted decimal value to represent a distinct position in the final permutation sequence, are handled by adding the next available step size value, of the multiple steps, to the subsequent colliding value and step size 1 is repeated at the end, if all the multiple step sizes are used and collision still persist, until a value representing a distinct position in the final permutation sequence is attained; and
    using the final permutation sequence, perform one of:
      perform permutation of one of (i) each data subblock or (ii) the data block to obtain permuted bits using the final permutation sequence; or
      generate parity equations for one of (i) each data subblock or (ii) the data block using the final permutation sequence.

11. The system as claimed in claim 10, wherein the permutated bits are used for implementation in an application type based on an actual assignment of the permuted bits.

12. The processor implemented method of claim 10, wherein the data block of size 'm' bits is retrievable, via the one or more hardware processors and the memory, using a decoding permutation sequence obtained from the final permutation sequence for all implementation types.

13. The processor implemented method as claimed in claim 12, wherein the step of forming 'm' number of bit groups of required bit size is based on one of (i) predefined bit sets or (ii) dynamically derived bit sets, wherein 'm' number of bit groups comprising specific bit size are formed using at least one static or dynamically driven operation comprising a circular left or right shift operations of rows, a circular left or right shift operations of columns, a circular left or right shift operations of diagonal elements, a logical or arithmetic right or left shift of rows, a logical or arithmetic right or left shift of columns and a logical or arithmetic right or left shift of diagonal elements of one of (i) each input subblock or (ii) the input block.

14. The processor implemented method as claimed in claim 13, wherein the step of determining one or more collision resolution rules with multiple step sizes for the at least one implementation type is based on one of (i) one or more predefined multiple step sizes or (ii) one or more dynamically derived multiple step sizes using the input block.

15. The processor implemented method as claimed in claim 14, wherein interdependencies between the final permutation sequence and input block is enhanced using at least one of (i) one or more arithmetic operations and (ii) one or more logical operations while deriving final permutation sequence and performing permutation of the data bits.

16. The processor implemented method as claimed in claim 14, further comprising iteratively performing the encoding steps to derive a final permutation sequence or encoded bits and successive decoding sequence for the at least one implementation type to obtain higher dependencies between the input bits and encoded data bits.

17. The processor implemented method as claimed in claim 16, wherein a value selected from the converted decimal values or final permutation sequence is used to perform at least one operation comprising a circular left or right shift operations of rows, a circular left or right shift operations of columns, a circular left or right shift operations of diagonal elements, a logical or arithmetic right or left shift of rows, a logical or arithmetic right or left shift of columns and a logical or arithmetic right or left shift of diagonal elements of one of (i) each data subblock or (ii) the data block.

18. The processor implemented method as claimed in claim 17, wherein the steps to derive a final permutation sequence or encoded bits are performed iteratively using at least one of one or more permutation sequence boxes, one or more substitution boxes and amalgamation with any existing cryptographic or hash function algorithms.

* * * * *